United States Patent [19]

Buchanan, Jr. et al.

[11] Patent Number: 5,542,145

[45] Date of Patent: Aug. 6, 1996

[54] WINDSHIELD WIPER SYSTEM HAVING A WIPER BLADE CAPABLE OF RETRACTION FOR HIDDEN PARK

[75] Inventors: Harry C. Buchanan, Jr., Spring Valley; Peter S. Zhou, Dayton, both of Ohio

[73] Assignee: ITT Automotive Electrical Systems, Inc., Auburn Hills, Mich.

[21] Appl. No.: 442,696

[22] Filed: May 17, 1995

[51] Int. Cl.⁶ ............................... B60S 1/32; B60S 1/36
[52] U.S. Cl. ................................. 15/250.16; 15/250.351; 15/250.23
[58] Field of Search ........................ 15/250.23, 250.21, 15/250.202, 250.203, 250.351, 250.32, 250.16, 250.34, 250.17

[56] References Cited

U.S. PATENT DOCUMENTS

| | | | |
|---|---|---|---|
| 2,784,437 | 3/1957 | Haas | 15/250.23 |
| 2,790,195 | 4/1957 | Wrobel | 15/250.23 |
| 3,247,540 | 4/1966 | Howard et al. | 15/250.23 |
| 4,621,389 | 11/1986 | Grare | 15/250.23 |
| 4,815,159 | 3/1989 | Kuhbach | 15/250.21 |
| 4,918,780 | 4/1990 | Scorsiroli | 15/250.23 |
| 5,119,523 | 6/1992 | Unterborn | 15/250.16 |
| 5,181,293 | 1/1993 | Baumgarten et al. | 15/250.21 |

FOREIGN PATENT DOCUMENTS

| | | | |
|---|---|---|---|
| 273146 | 11/1987 | Japan | 15/250.23 |
| 87344 | 4/1988 | Japan | 15/250.23 |
| 55780 | 10/1935 | Norway | 15/250.23 |

*Primary Examiner*—Gary K. Graham
*Attorney, Agent, or Firm*—Ratner & Prestia

[57] ABSTRACT

A windshield wiper system for automotive vehicles includes a rack and pinion arrangement in the wiper arm for causing movement of a wiper blade assembly relative to the wiper arm between an extended position of the wiper blade assembly and a retracted position of the wiper blade assembly. More specifically, the rack and pinion arrangement causes a link, which is attached to the wiper blade assembly, to swing such that the wiper blade moves between the extended position and the retracted position. The movement of the wiper blade assembly into the extended position increases the amount of the surface area of the windshield which is wiped. A planetary gear arrangement is driven by a standard wiper drive and selectively drives the rack and pinion arrangement to move the wiper blade assembly between the extended and retracted positions.

7 Claims, 7 Drawing Sheets

WINDSHIELD WIPER SYSTEM HAVING A WIPER BLADE CAPABLE OF RETRACTION FOR HIDDEN PARK

FIELD OF THE INVENTION

This invention relates to windshield wiper arrangements for automotive vehicles having a wiper blade which is extended during operation relative to the wiper arm, as compared to the position of the wiper blade relative to the wiper arm while the wiper blade is in the "hidden park position." In this way, the amount of surface area of the windshield which is wiped (defined by the lower "inwipe" position, the upper "outwipe" position, and the distances from the wiper arm oscillation point to the innermost and outermost points of the wiper blade) is increased.

BACKGROUND OF THE INVENTION

As windshields become more and more sloped, a wiper which is long enough to wipe a sufficient area of the windshield to comply with Federal Motor Vehicle Safety Standards (FMVSS) might be so long that it would hit an obstruction if it were made to park at its normal wiping length. This design requirement is presently particularly troublesome for the passenger's side (i.e., right) windshield wiper of a pair of wipers that move back and forth in the familiar tandem pattern. In the future, this design requirement could also become a consideration in the design of a driver's side (i.e., left) windshield wiper or a rear window windshield wiper. The obstruction for a passenger's side windshield wiper is the side edge molding of the windshield itself or another vehicle body component, such as the hood hinge. In other words, there is only so much space available along the recess just below the lower windshield edge in which to park the wiper.

A wiper which is fabricated shorter in order to be accommodated in the available wiper parking space will not be in compliance with FMVSS. More specifically, such a wiper would be too short to wipe a sufficient area of the windshield to comply with FMVSS. Besides the problem of accommodating the wiper in the limited available space, other factors, such as the effect of freezing rain, snow, or debris, must be taken into consideration in the design of hidden park wiper arrangements. Thus, wiper mechanisms for enlarged windshields in the future will be arranged with arms which extend during operation and retract when being parked. To achieve both FMVSS compliance and provide hidden park, the wiper arm should be shortened by approximately 45 mm to 75 mm when going into the hidden park position and returned to an extended length during operation.

U.S. Pat. No. 5,119,523 discloses a linkage arrangement by which the wiper blade assembly is attached to the remote end of the wiper arm for pivotal movement to extend and retract the wiper blade assembly. In this system, the force of a spring acts on the linkage arrangement thereby causing the wiper blade to achieve its extended position during the normal wipe pattern. As the wiper blade is restored to its hidden park position, an external striker plate exerts a force on the linkage arrangement in a direction opposite to the direction of the force of the spring. In this way, the wiper blade assumes its retracted position.

SUMMARY OF THE INVENTION

The present invention relates to a windshield wiper system including a wiper post, a wiper arm mounted to the wiper post for oscillatory movement, and a device for imparting oscillatory movement to the wiper arm. The system of the present invention also includes a wiper blade assembly, a rack and pinion unit, a link attached at a first end to the wiper blade assembly and at a second end to the pinion, and a planetary gear assembly and other components extending between the drive device and the rack for imparting linear movement to the rack.

The rack and pinion unit includes a rack mounted within the wiper arm for linear movement in a first direction and in a second direction opposite to the first direction. The rack and pinion unit also includes a pinion which engages the rack and is mounted to the wiper arm at an end remote from the end of the wiper arm which is connected to the wiper post. The pinion rotates about an axis of rotation parallel to a plane passing perpendicularly through the wiper post in a first rotational direction upon linear movement of the rack in the first linear direction, and rotates in a second rotational direction opposite to the first rotational direction upon linear movement of the rack in the second linear direction. With this configuration, the windshield wiper system of the present invention includes a wiper blade which is extended relative to the wiper arm during operation as compared to the position of the wiper blade relative to the wiper arm when the wiper blade is in a hidden park position. With the wiper blade in an extended position during operation, the amount of wiped surface area is increased.

It is to be understood that both the foregoing general description and the following detailed description are exemplary, but not restrictive, of the invention.

BRIEF DESCRIPTION OF THE DRAWINGS

The invention is best understood from the following detailed description when read in connection with the accompanying drawings, in which.

DETAILED DESCRIPTION OF THE INVENTION

Figure 1:
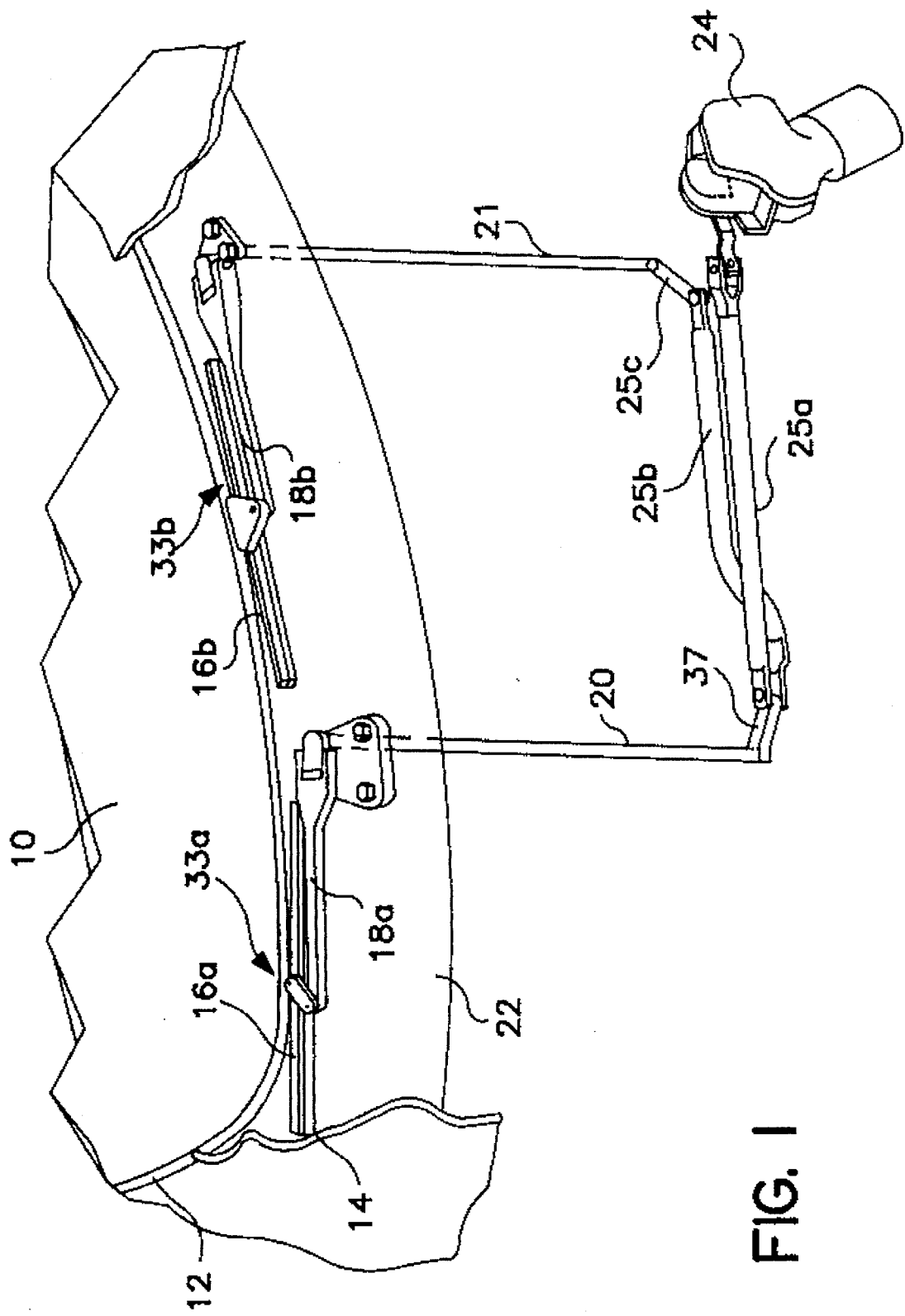
FIG. 1 is a perspective view of a portion of a vehicle body, a windshield, and a drive unit for windshield wipers, with which a wiper system in accordance with the present invention may be used.

FIG. 1 shows a portion of the vehicle body which is the environment for a wiper system in accordance with the present invention. More specifically, FIG. 1 shows a windshield 10, a portion of a vehicle body 12 and a side edge molding 14 of the windshield. Molding 14 confines wiper blade 16a, which is the wiper blade for the passenger's side of the automotive vehicle. Depending on the particular design of the vehicle, other components, such as a hood hinge, could be obstructions to wiper blade 16a. Wiper blade 16b is the wiper blade for the driver's side of the automotive vehicle. Wiper blade assemblies 33a and 33b, on which wiper blades 16a and 16b are mounted, are respectively mounted to wiper arms 18a and 18b. Wiper arm 18a is connected at one end to a wiper post 20, which may be tubular, and wiper arm 18b is connected at one end to a wiper post 21.

FIG. 1 also shows a conventional wiper drive system for imparting oscillatory movement to wiper arms 18a and 18b from a lower "inwipe" position to an upper "outwipe" position during normal wiping. Wiper posts 20, 21 extend downward below a sheet metal portion 22 of the automotive vehicle. A conventional drive device, such as a wiper motor 24, causes oscillation of wiper post 20 through a drive bar 25a and a drive arm 37. Similarly, wiper motor 24 causes oscillation of wiper post 21 through drive bars 25a, 25b, and 25c, which are pivotally connected to one another.

FIG. 1 does not show the components which cause wiper blade 16a to extend relative to wiper arm 18a as wiper blades 16a and 16b move from the hidden park position to the upper "outwipe" position. FIG. 1 does show wiper blades 16a and 16b in the hidden park position, which means a position in a recess below the lower windshield edge. This position is contrasted with the lower "inwipe" position which is the lower position wiper blades 16a and 16b oscillate to and from during normal wiping. The upper "outwipe" position is the upper position which wiper blades 16a and 16b oscillate to and from during normal wiping.

Figure 2A:
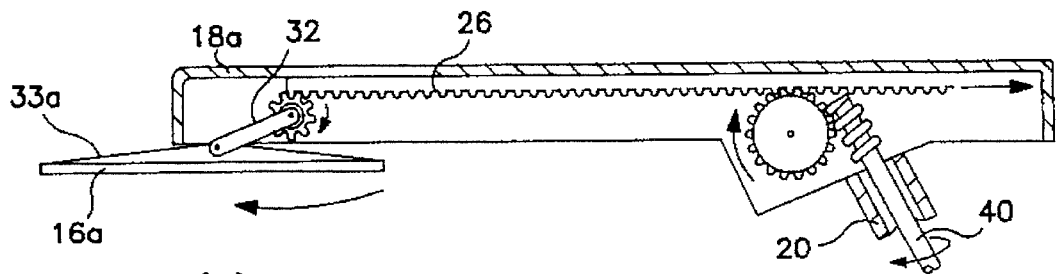
FIGS. 2(a), 2(b), and 2(c) are longitudinal views of a wiper arm and wiper blade, which is out of scale, in accordance with the present invention with the wiper blade in its extended, intermediate, and retracted positions, respectively.
Figure 2B:
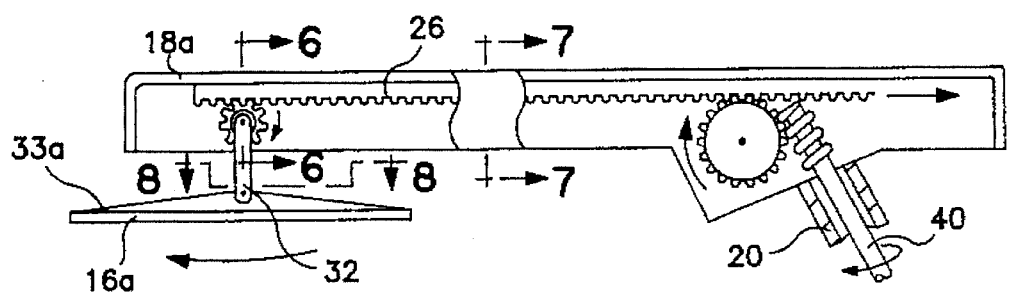
Figure 2C:
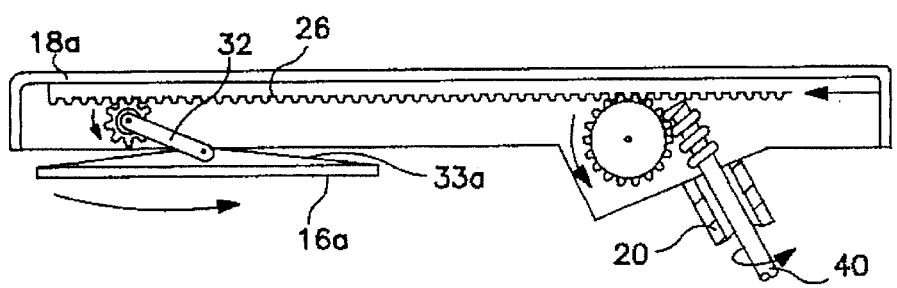
Figure 3A:
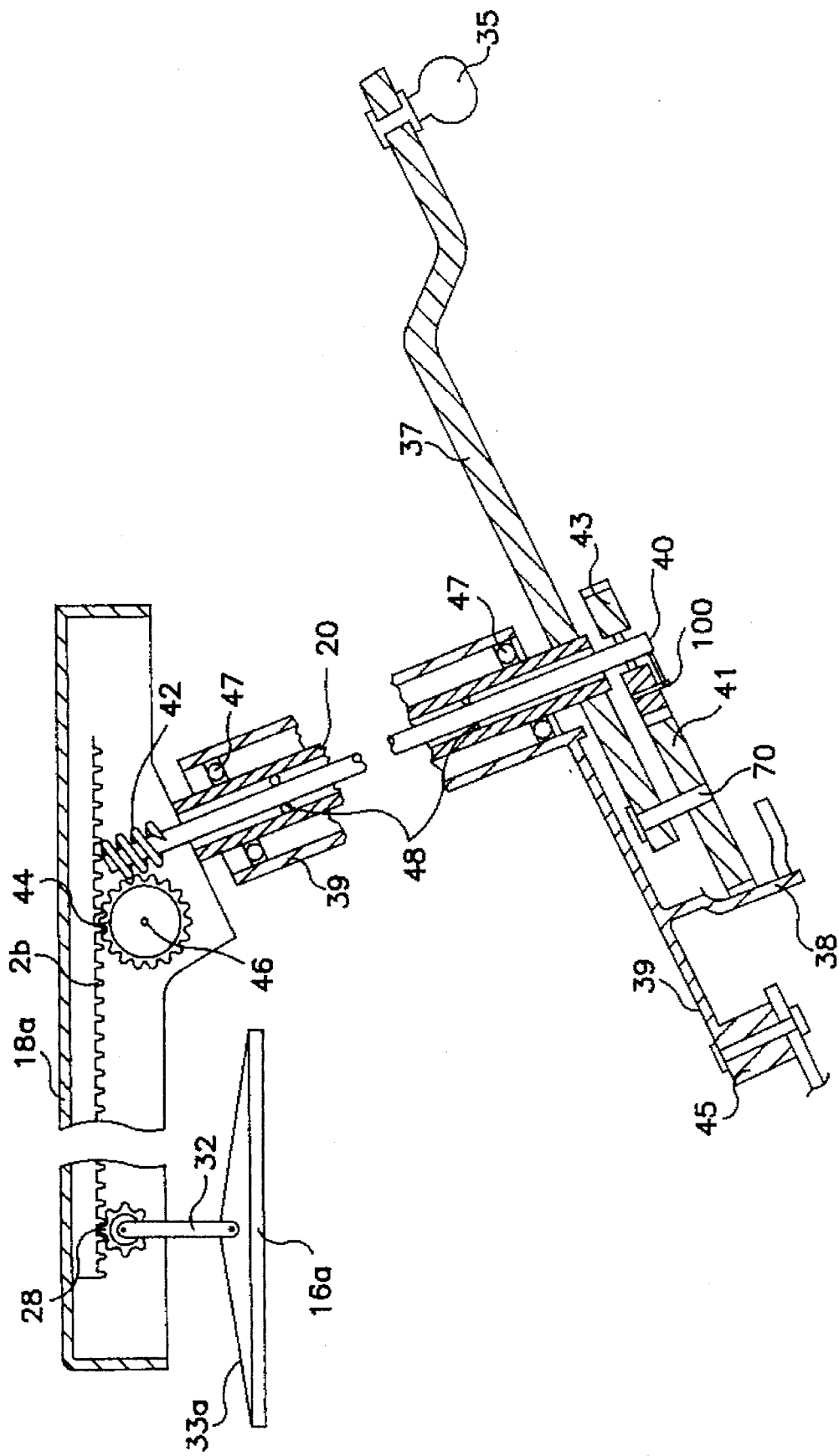
FIGS. 3(a) and 3(b) are partial cross-sectional views of a wiper system in accordance with a first and second embodiment of the present invention, respectively.
Figure 3B:
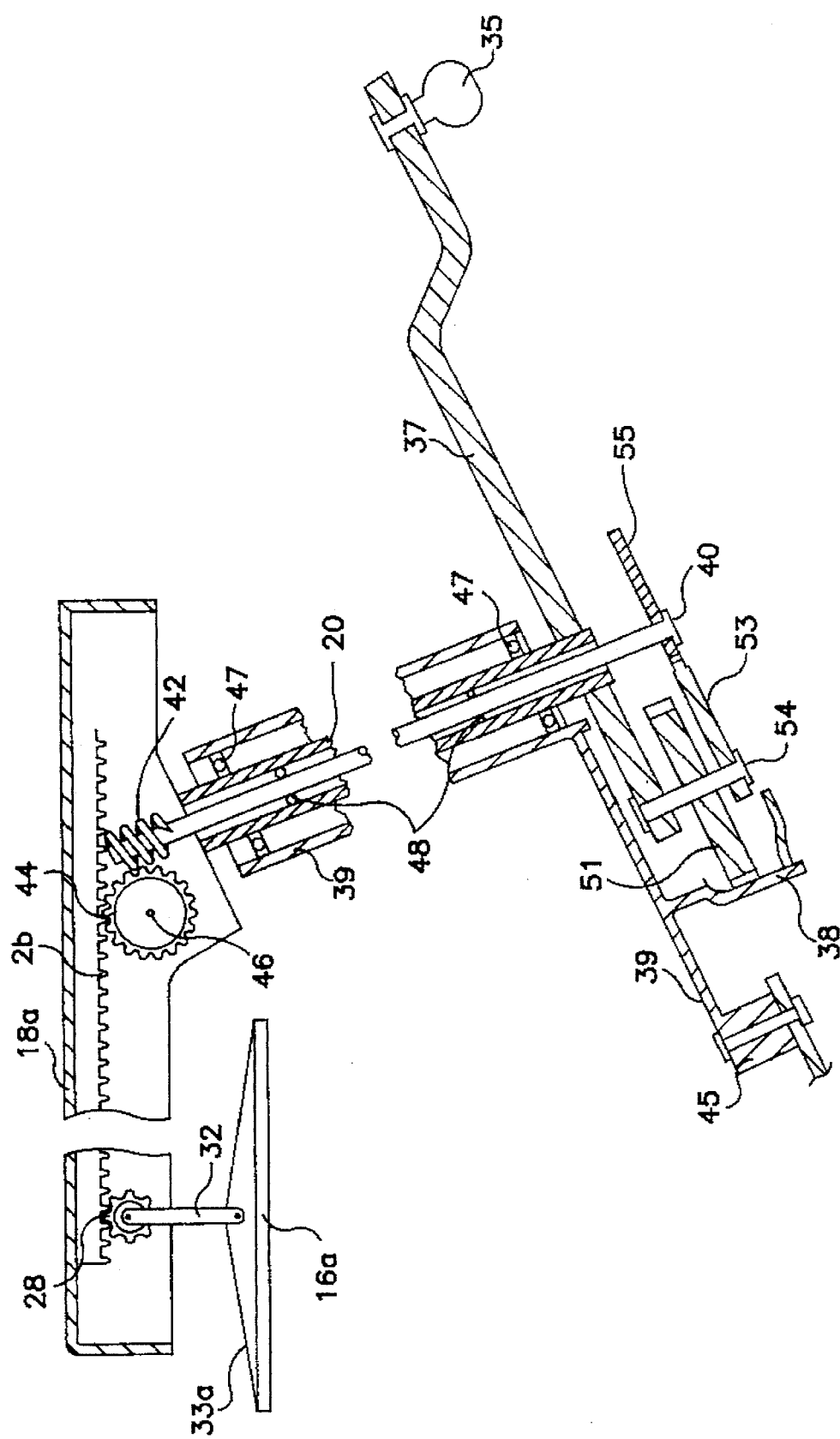
Figure 6:
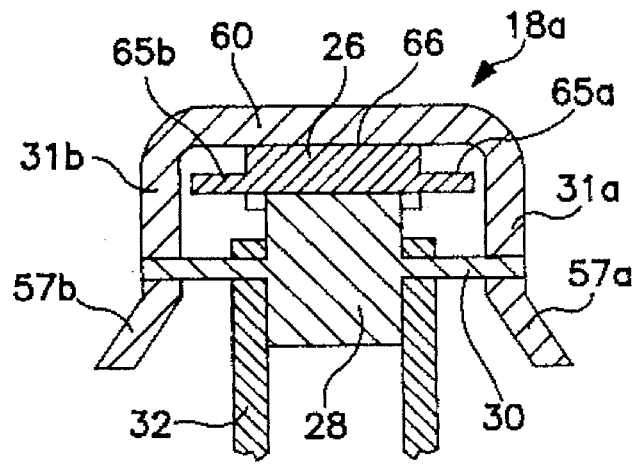
FIG. 6 is a cross-sectional view along the line 6—6 of FIG. 2(b)

FIGS. 2(a), 2(b), 2(c), 3(a), and 3(b) show the components which cause wiper blade 16a to extend relative to wiper arm 18a as wiper blades 16a and 16b from the hidden park position to the outwipe position. As shown in FIGS. 3(a) and 3(b), a rack and pinion unit includes a rack 26 mounted within wiper arm 18a for linear movement in a first direction and a second direction opposite to the first direction. The first and second directions are parallel to wiper arm 18a. Rack 26 may be slightly flexible to conform with any curvature of wiper arm 18a. The rack and pinion unit also includes a pinion 28 having teeth which engage the teeth of rack 26. Pinion 28 is mounted to wiper arm 18a near the end of wiper arm 18a remote from the end of wiper arm 18a which is attached to wiper post 20. Pinion 28 is mounted by a hinge pin 30 to wiper arm 18a such that pinion 28 does not move linearly relative to wiper arm 18a, as shown in FIG. 6. Hinge pin 30, which is rotatably mounted to side walls 31a and 31b of wiper arm 18a, rotates with pinion 28.

As rack 26 moves in a first direction (i.e., to the right as shown in FIGS. 2(a), 2(b), and 2(c)), pinion 28 is caused to rotate about an axis of rotation parallel to a plane passing perpendicularly through the wiper post in a first rotational direction (i.e., clockwise as shown in FIGS. 2(a), 2(b), and 2(c)). Similarly, as rack 26 moves in a second linear direction (i.e., to the left as shown in FIGS. 2(a), 2(b), and 2(c)), pinion 28 is caused to move in a second rotational direction (i.e., counterclockwise as shown in FIGS. 2(a), 2(b), and 2(c)).

A link 32, shown in FIGS. 2(a), 2(b), 2(c), 3(a), 3(b), and 6, is attached at a first end to wiper blade assembly 33a. Link 32 is attached at a second end to pinion 28 and moves rotatably with pinion 28. Thus, link 32 undergoes swinging movement in a first direction with rotation of pinion 28 in the first rotational direction and undergoes swinging movement in a second swinging direction opposite to the first swinging direction upon rotation of pinion 28 in the second rotational direction.

FIGS. 3(a), 3(b), 4(a), 4(b), 5(a), and 5(b) show planetary gear assemblies in accordance with first and second embodiments of the present invention. In each case, the gear assemblies are coupled to drive arm 37 on which is mounted a link ball 35, to which drive bar 25a is attached. As wiper motor 24 moves link ball 35 back and forth, drive arm 37 also moves back and forth. Drive arm 37 is connected to wiper post 20 and has an end remote from link ball 35 which is disposed near an arc-shaped gear sector 38. Arc-shaped gear sector 38 is grounded (i.e., attached to a vehicle sheet metal part or a housing 39).

As shown in FIGS. 3(a) and 3(b), housing 39 may in turn be attached to or made integral with a mount 45 through which bolts may be disposed to mount, or ground, gear sector 38 to a non-moving automotive part, such as a sheet metal part or a casting. Housing 39 also surrounds wiper post 20, and bearings 47 permit wiper post 20 to rotate relative to housing 39. Similarly, a shaft 40 extends through the center of wiper post 20 and can rotate relative to wiper post 20 through bearings 48. Shaft 40 has a first end near rack 26.

The planetary gear assembly shown in FIG. 3(a) extends between arc-shaped gear sector 38 and shaft 40 and causes rotational movement of shaft 40 only during a portion of the swinging movement of drive arm 37. During normal wiping, drive arm 37 moves over a first angular range between a first position corresponding to the inwipe position and a second position corresponding to the outwipe position. When the windshield wipers are turned off or on, drive arm 37 moves over a second angular range, greater than the first angular range, between a third position corresponding to the hidden park position and the second position corresponding to the outwipe position. This gear assembly is configured such that shaft 40 is caused to rotate when drive arm 37 approaches the second position (corresponding to the outwipe position) immediately after the windshield wipers are turned on and when drive arm 37 approaches the third position (corresponding to the hidden park position) immediately after the windshield wipers are turned off. In other words, the gear assembly causes shaft 40 to rotate in one rotational direction as drive arm 37 approaches the second position during an oscillatory movement pattern (i.e., the first wiping pattern after the windshield wipers are turned on) of drive arm 37 over the second angular range. Also, the gear assembly causes shaft 40 to rotate in the other rotational direction as drive arm 37 approaches the third position during an oscillatory movement pattern (i.e., the last full wiping pattern before the windshield wipers are turned off) of drive arm 37 over the second angular range. This gear assembly can be configured to cause linear movement of rack 26 for providing a linear extension of wiper blade 16a of approximately 45 mm to 75 mm.

Figure 4A:
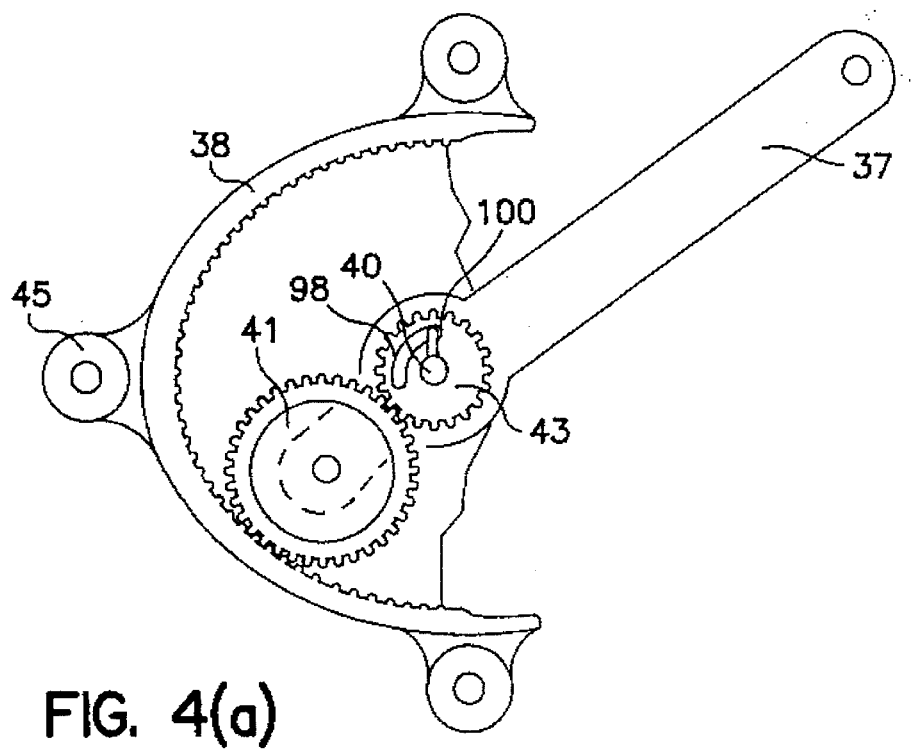
FIGS. 4(a) and 4(b) are bottom plan views of the wiper system in accordance with the first embodiment as shown in FIG. 3(a)
Figure 4B:
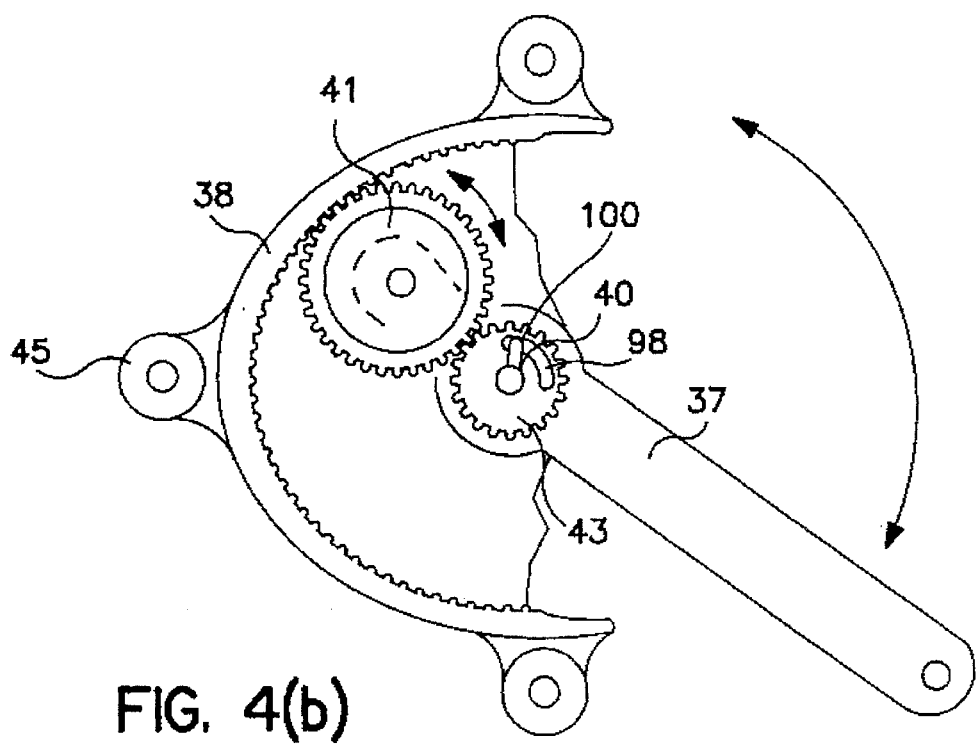
Figure 5A:
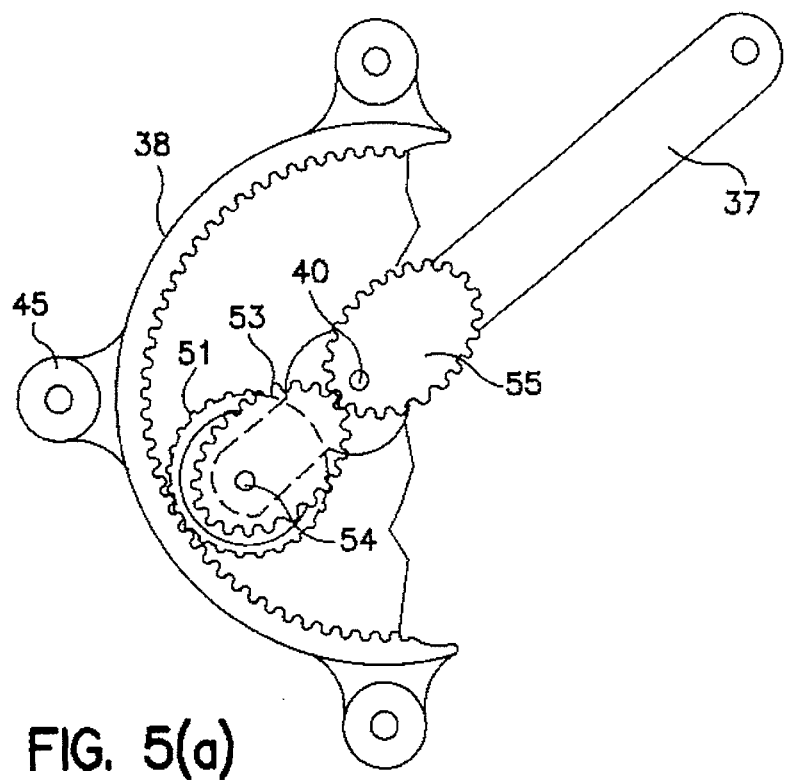
FIGS. 5(a) and 5(b) are bottom plan views of the wiper system in accordance with the second embodiment as shown in FIG. 3(b)
Figure 5B:
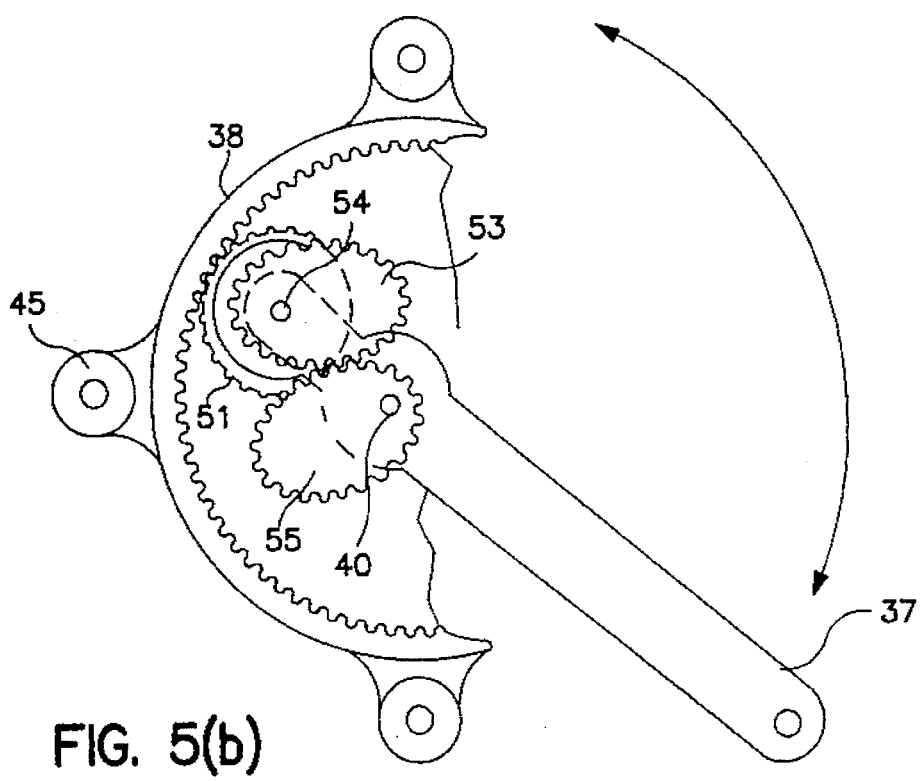

As shown in FIGS. 3(a), 4(a), and 4(b), a drive gear 41 is mounted on and rotatable with a drive gear shaft 70, which is coupled to drive arm 37 at the second end of drive arm 37 and is rotatable relative to drive arm 37. In addition, drive gear 41 is in engagement with gear sector 38 during the swinging movement of drive arm 37. A driven gear 43 is engaged with drive gear 41 during the swinging movement of drive arm 37 and is rotatable relative to shaft 40.

Driven gear 43 has an arcuate recess 98 having an angular range, which is greater than the first angular range (i.e., the angular range traversed by drive arm 37 as wiper arm 18*a* moves between the inwipe position and the outwipe position) and less than the second angular range (i.e., the angular range traversed by drive arm 37 as wiper arm 18*a* moves between the hidden park position and the outwipe position). A pin 100 is mounted to shaft 40 and protrudes into arcuate recess 98, for causing the selective rotational movement of shaft 40. Pin 100 may be comprised of two perpendicular rods.

FIG. 4(*a*) shows drive arm 37 in the third position corresponding to wiper arm 18*a* in the hidden park position. FIG. 4(*b*) shows drive arm 37 in the second position corresponding to wiper arm 18*a* in the outwipe position. During the first oscillatory movement pattern of drive arm 37, the left end (as shown in FIGS. 4(*a*) and 4(*b*)) of recess 98 abuts against and moves pin 100, thereby causing rotation of shaft 40. After the initial oscillatory movement pattern of drive arm 37, neither end of arcuate recess 98 will abut against pin 100 during normal wiping. When the windshield wipers are turned off, the right end (as shown in FIGS. 4(*a*) and 4(*b*)) of arcuate recess 98 will abut against pin 100, thereby causing movement of shaft 40 as wiper arm 18*a* approaches the hidden park position. The specific relative size and location of arcuate recess 98 depend on the range of motion of drive arm 37, the size of the gears, the desired extension length of wiper blade 16*a*, and the point at which wiper blade 16*a* should be moved to its retracted position.

A second embodiment of the gear assembly is shown in FIGS. 3(*b*), 5(*a*), and 5(*b*) and uses a first circular drive gear 51 mounted on and rotatable with a drive gear shaft 54, which is coupled to drive arm 37 at the second end of drive arm 37 and is rotatable relative to drive arm 37. Circular drive gear 51 is engaged with gear sector 38. An elliptical drive gear 53 is mounted coaxially with circular drive gear 51, with the two gears sharing a common axis of rotation, i.e. drive gear shaft 54. More specifically, elliptical drive gear 53 is mounted adjacent circular drive gear 51, such as just below circular drive gear 51 as shown in FIG. 3(*b*). Elliptical driven gear 55 is engaged with elliptical drive gear 53 and mounted coaxially with shaft 40.

Elliptical driven gear 55 rotates at significantly different speeds during the swinging movement of drive arm 37, over which elliptical drive gear 53 remains engaged with elliptical driven gear 55. The elliptical gear pair is designed to obtain different speed ratios depending on the angular position of drive arm 37. For example, during normal wiping as shown in FIG. 5(*b*), the speed ratio is very small which results in only a negligible (if any) extension and retraction of wiper blade 16*a* during normal wiping. On the other hand, as drive arm 37 moves between positions corresponding to the inwipe and hidden park positions of wiper arm 18*a* as shown in FIG. 5(*a*), the speed ratio is very large which results in a significant extension of wiper blade 16*a*. This gear assembly also can be configured to cause linear movement of rack 26 for providing a linear extension of wiper blade 16*a* of approximately 45 mm to 75 mm.

Regardless of the embodiment of the planetary gear assembly, a helical gear 42 is mounted to shaft 40 near the end of shaft 40 close to rack 26, as shown in FIGS. 3(*a*) and 3(*b*). Helical gear 42 engages a worm gear 44, which is mounted to wiper arm 18*a* by a pivot 46 which extends between side walls 31*a* and 31*b* in the same manner as pivot 30 mounts pinion 28. Thus, worm gear 44 does not move linearly relative to wiper arm 18*a*, but does rotate relative to wiper arm 18*a* and serves the purpose of translating the rotational movement of shaft 40 to linear movement of rack 26.

Figure 7:
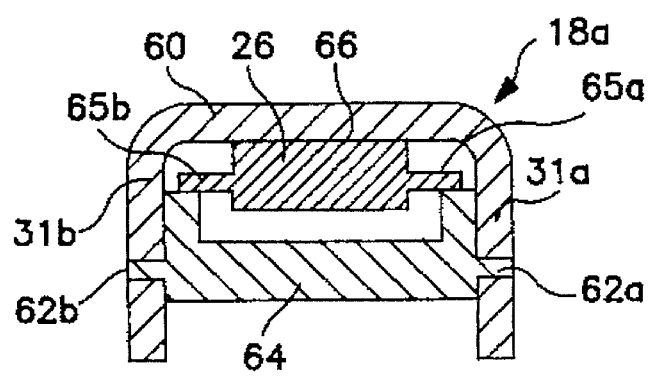
FIG. 7 is a cross-sectional view along the line of 7—7 of FIG. 2(b)
Figure 8:
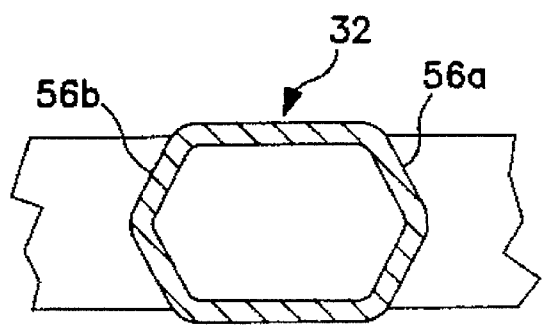
FIG. 8 is a partial cross-sectional view along the line 8—8 of FIG. 2(b).

As shown in FIGS. 6, 7, and 8, link 32 has a hexagonal cross-section and walls 31*a* and 31*b* of wiper arm 18*a* have outwardly extending flanges 57*a* and 57*b* which are disposed at an angle for abutting against the side walls 56*a* and 56*b* of link 32 when the wiper blade 16*a* is either at or near its extended position or its retracted position. The force caused by the weight of wiper arm 18*a* is transferred downward against link 32 so that the outwardly extending flanges 57*a* and 57*b* abut against side walls 56*a* and 56*b* of link 32. This abutment of surfaces permits the appropriate amount of wiping force to be transmitted from wiper arm 18*a* to wiper blade 16*a* and also takes some of the load off of the other components of this system, such as pinion 28 and link 32.

Also, as shown in FIGS. 6 and 7, wiper arm 18*a* has a bottom wall 60. As shown in FIG. 7, wiper arm 18*a* need not have extending flanges at an area which is remote from link 32. More specifically, at areas remote from link 32, wiper arm 18*a* may have straight side walls 31*a* and 31*b* having openings 62*a* and 62*b*. Fastened within three openings is a clip 64 for restraining rack 26 within the longitudinal recess which is formed by bottom wall 60 and side walls 31*a* and 31*b*, yet allowing linear movement of rack 26 along the longitudinal recess. Also shown in FIGS. 6 and 7 is a strip of low friction material 66 which is disposed between bottom wall 60 and rack 26, for permitting ease of movement of rack 26. Rack 26 has tabs 65*a* and 65*b* which extend outward which abut against and move along clip 64. For ease of movement between rack 26 and clip 64, bearings may be disposed at the junction of tabs 65*a* and 65*b* and clip 64.

In operation, drive arm 37 of a standard linkage oscillates wiper post 20 to oscillate the wiper arm 18*a*. The planetary gear arrangement, in response to movement of drive arm 37, causes shaft 40, extending through wiper post 20, to rotate as discussed above. Shaft 40, in turn, causes rack 26, movable within wiper arm 18*a*, to move linearly in one direction when wiper arm 18*a* is to emerge from the hidden park position (or approaches the outwipe position for the first time since the wipers were turned on if the gear assembly of FIGS. 5(*a*) and 5(*b*) are used). Shaft 40 causes rack 26 to move in the opposite direction when the wiper arm 18*a* enters the hidden park position. Pinion 28 is fixed against linear movement by attachment to wiper arm 18*a* and rotates in response to the linear movement of rack 26. Movement of rack 26 causes link 32 and wiper blade assembly 33 to swing from an extended position (as shown in FIG. 2(*a*)), to an intermediate position (as shown in FIG. 2(*b*)), and finally to a retracted position (as shown in FIG. 2(*c*)), as the wiper arm enters the hidden park position.

Although the invention is illustrated and described herein with reference to certain specific embodiments, the claims are not intended to be limited to the details shown. Rather, the claims should be read to include various modifications of the details shown without departing from the spirit of the invention. For example, the embodiments described above refer to the use of the invention for the wiper for the passenger's side (i.e., right) windshield wiper. Nonetheless, the system of the present invention could also be used to extend and retract a wiper blade for a driver's side (i.e., left) windshield wiper or a rear window windshield wiper.

What is claimed:

1. A windshield wiper system comprising:

a wiper post extending perpendicular to a plane;

an elongated wiper arm having a first end mounted to said wiper post for oscillatory movement and a second free end;

a rack and pinion unit including:

(a) a rack slidably mounted within said wiper arm for:
   (i) linear movement in a first linear direction, and
   (ii) linear movement in a second linear direction opposite to the first linear direction, (b) a pinion engaging said rack, rotatably mounted to said wiper arm proximate to said second end of said wiper arm, and having an axis of rotation parallel to said plane for:
   (i) rotating in a first rotational direction upon linear movement of said rack in the first linear direction, and
   (ii) rotating in a second rotational direction opposite to the first rotational direction upon linear movement of said rack in the second linear direction;

wiper blade assembly;

an elongated link attached at a first end to said wiper blade assembly and fixed at a second end to said pinion for:

(a) swinging movement in a first swinging direction upon rotation of said pinion in the first rotational direction to extend said blade assembly longitudinally along said arm away from said first end; and (b) swinging movement in a second swinging direction opposite to the first swinging direction upon rotation of said pinion in the second rotational direction to retract said blade assembly longitudinally along said arm toward said first end;

drive means for imparting oscillatory movement to said wiper arm; and means extending between and connected to said drive means and said rack for imparting linear movement to said rack in the first and second linear directions.

2. A windshield wiper system in accordance with claim 1, wherein:

said wiper post is tubular;

said drive means include:

(a) a wiper motor, and (b) a drive arm, coupled to said wiper motor, movable in response to said wiper motor, and connected to said wiper post;

said means for imparting linear movement to said rack include:

(a) a fixed arc-shaped gear sector, (b) an elongated shaft extending through said wiper post and having a first end near said rack, (c) means, coupled to said drive arm and extending between said gear sector and a second end of said shaft, for causing rotational movement of said shaft, (d) a helical gear mounted to said shaft at the first end of said shaft, and (e) a worm gear, mounted to said wiper arm, and engaged with said rack and said helical gear for transferring the rotational movement of said shaft to the linear movement of said rack.

3. A windshield wiper system in accordance with claim 2, wherein:

said drive arm moves over:

(a) a first angular range, during normal wiping, between a first position corresponding to an inwipe position of said wiper arm and a second position corresponding to an outwipe position of said wiper arm, and (b) a second angular range, greater than said first angular range, between a third position corresponding to a hidden park position of said wiper arm and said second position corresponding to said outwipe position of said wiper arm; and said means for causing rotational movement of said shaft include:

(a) a drive gear rotatably mounted on said drive arm and rotatable relative to said drive arm and engaged with said gear sector, and (b) a driven gear engaged with said drive gear and rotatable relative to said shaft and having an arcuate recess having a third angular range, which is greater than said first angular range and less than said second angular range, and (c) a pin, mounted to said shaft and protruding into said arcuate recess, for causing rotational movement of said shaft in a:
   (i) third rotational direction as said drive arm approaches said second position during an oscillatory movement pattern of said drive arm over said second angular range, and
   (ii) fourth rotational direction, opposite to said third rotational direction, as said drive arm approaches said third position during said oscillatory movement pattern of said drive arm over said second angular range.

4. A windshield wiper system in accordance with claim 2, wherein said means for causing rotational movement of said shaft include:

a circular drive gear rotatably coupled to said drive arm at said second end of said drive arm and rotatable relative to said drive arm and engaged with said gear sector;

an elliptical drive gear mounted coaxially to said circular drive gear; and an elliptical driven gear engaged with said elliptical drive gear and mounted coaxially to said shaft for causing rotational movement of said shaft in a:
   (i) third rotational direction as said drive arm moves in a first oscillatory direction, and
   (ii) fourth rotational direction, opposite to said third rotational direction, as said drive arm moves in a second oscillatory direction, opposite to said first oscillatory direction.

5. A windshield wiper system in accordance with claim 1, wherein said wiper arm has a bottom wall and two side walls to form a longitudinal recess along which said rack moves linearly and further comprising at least one clip for restraining said rack within said recess and allowing linear movement of said rack.

6. A windshield wiper system in accordance with claim 5 further comprising a strip of low friction material disposed in said longitudinal recess between said bottom wall of said wiper arm and said rack.

7. A windshield wiper system in accordance with claim 6, wherein:

said side walls of said wiper arm are flanged outwardly in an area proximate to said link; and said link has a hexagonal transverse cross-section for abutting against said outwardly flanged side walls when said wiper blade is in an extended position and in a retracted position.

\* \* \* \* \*

UNITED STATES PATENT AND TRADE MARK OFFICE
CERTIFICATE OF CORRECTION

PATENT NO.   : 5,542,145
DATED        : August 6, 1996
INVENTOR(S)  : Buchanan et al.

It is certified that error appears in the above-identified patent and that said Letters Patent is hereby corrected as shown below:

In column 7, line 16, before "wiper blade assembly;" insert --an elongated--.

Signed and Sealed this

Seventh Day of January, 1997

Attest:

Attesting Officer

BRUCE LEHMAN

Commissioner of Patents and Trademarks